US006313592B1

(12) United States Patent
Voss et al.

(10) Patent No.: US 6,313,592 B1
(45) Date of Patent: Nov. 6, 2001

(54) METHOD FOR CONTROLLING A MOTOR VEHICLE HAVING AN ELECTRIC DRIVE MECHANISM

(75) Inventors: Thomas Voss, Tettnang; Bernd Müller, Friedrichshafen; Bert Hellwig, Friedrichshafen; Gerald Karch, Friedrichshafen; Werner Wolfgang, Ravensburg, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/673,590

(22) PCT Filed: May 3, 1999

(86) PCT No.: PCT/EP99/02981

§ 371 Date: Oct. 18, 2000

§ 102(e) Date: Oct. 18, 2000

(87) PCT Pub. No.: WO99/58361

PCT Pub. Date: Nov. 18, 1999

(30) Foreign Application Priority Data

May 9, 1998 (DE) .............................................. 198 20 900

(51) Int. Cl.$^7$ ...................................................... H02P 3/20
(52) U.S. Cl. .......................... 318/373; 318/146; 318/144
(58) Field of Search ................... 318/139, 140, 318/142, 143, 144, 146, 147, 151, 152, 157, 158, 430–434, 373; 388/800, 806, 815, 823; 180/170, 179

(56) References Cited

U.S. PATENT DOCUMENTS

| 4,124,088 | 11/1978 | Kuriyama et al. . | |
|---|---|---|---|
| 5,030,898 | * 7/1991 | Hokanson et al. | 318/146 |
| 5,264,763 | * 11/1993 | Avitan | 318/139 |
| 5,565,760 | * 10/1996 | Ball et al. | 318/373 |

FOREIGN PATENT DOCUMENTS

| 2 260 939 | 6/1974 | (DE) . |
| 44 40 311 A1 | 6/1995 | (DE) . |
| 44 44 545 A1 | 6/1995 | (DE) . |
| 195 23 985 A1 | 1/1996 | (DE) . |
| 0 710 582 A1 | 5/1996 | (EP) . |

* cited by examiner

Primary Examiner—Khanh Dang
(74) Attorney, Agent, or Firm—Davis & Bujold, P.L.L.C.

(57) ABSTRACT

The invention relates to a method for controlling a motor vehicle having electric drive mechanism, especially a city autobus, in which one or more wheels are driven by one electric motor and which is provided with an electric brake and a control circuit, wherein when a first defined threshold value (1) of the rotational speed (n) of the electric motor is exceeded, the drive torque (m) is cut back and is reduced down to zero when the rotational speed (n) continues to increase, and that when a second defined threshold value (3) of the rotational speed (n) which is higher than the first threshold value (1) is exceeded, the electric brake is engaged and as the rotational speed increases exerts a maximum brake torque when a limit value (4) is reached.

1 Claim, 1 Drawing Sheet

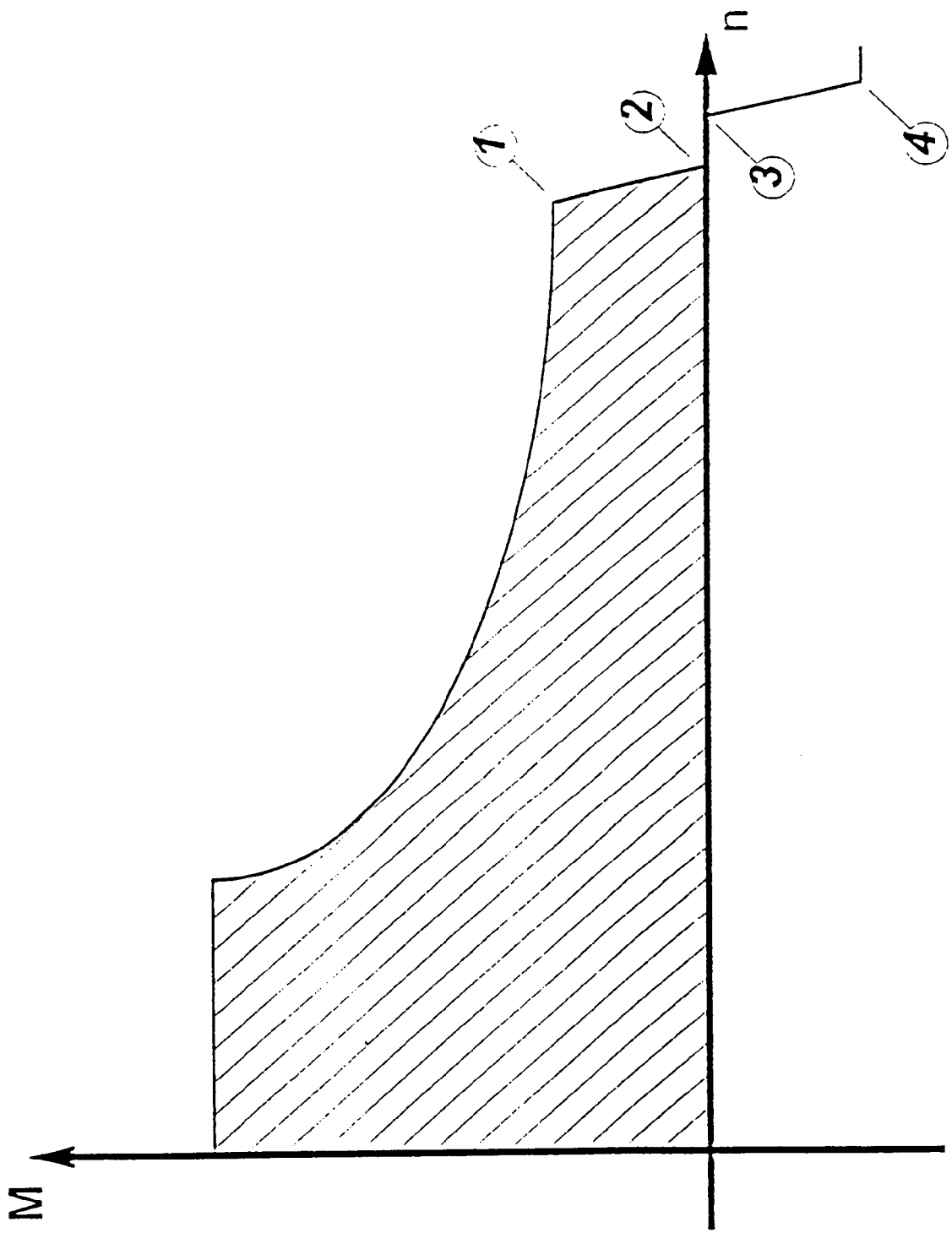

METHOD FOR CONTROLLING A MOTOR VEHICLE HAVING AN ELECTRIC DRIVE MECHANISM

FIELD OF THE INVENTION

The invention relates to a method for controlling a motor vehicle having an electric drive mechanism, especially a city autobus, in which one or more wheels are driven by an electric motor and which is provided with an electric brake and a control circuit.

BACKGROUND OF THE INVENTION

Vehicles, having an electric drive mechanism, are particularly used when an emission must be prevented. This is specially desired in industrial sheds and in towns or cities not only in case of smog danger. In many towns, whole areas are allowed only for motor vehicles, having electric drive mechanism, particularly city autobuses being provided with such electric drive mechanisms.

As energy source for the electric drive mechanism are usually considered lead storage batteries to which are attached on electric motors which drive the wheels of the motor vehicle. Direct current shunt motors of easily controllable rotational speed are adequate for conventional vehicles with electric drive mechanism.

In purely electric vehicles such as city autobuses which have easily replaceable batteries or rechargeable batteries, a real disadvantage is the small range, the heavy weight and the large volume of the storage batteries. For this reason, hybrid vehicles have been proposed which have, on one hand, an electric drive mechanism with electric motor and chargeable batteries and, on the other, an internal combustion engine for driving a generator which charges the battery of the vehicle. Compared to conventional pure electric drive mechanisms, hybrid drive mechanisms have the advantage that problems of limited range and of long periods of time for recharging the batteries can be overcome; but a hybrid drive mechanism does not remove the problem of volume and weight, but rather increases them by the additional internal combustion engine.

In DE A 44 44 545 has been disclosed a hybrid vehicle, wherein the hybrid vehicle has an internal combustion engine for driving the vehicle, an electric motor for driving the vehicle, a battery for feeding the electric motor and a generator different from the electric motor for charging the battery. This is a so-called parallel hybrid vehicle where the battery is charged via the electric motor which, while the vehicle is driven, can be shifted by the internal combustion engine as generator. Therefore, such a parallel hybrid vehicle is a vehicle which can optionally be used for short distances (up to about 100 km) as pure electric vehicle, but otherwise is designed as vehicle with internal combustion engine and also predominantly used therewith.

DE A 195 23 985 discloses a control device for such a hybrid vehicle having as source of energy one electric motor and one internal combustion engine, wherein energy produced by the prime mover is applied to a motor/generator, via a generator inverter, so that the motor/generator drives the internal combustion engine in order to apply thereto a braking force. In this manner, energy which has been produced during the regenerative braking and cannot be absorbed by a saturated batter, e.g. when the vehicle moves downhill, is used in order to assist the braking of the vehicle. At the time, when the vehicle moves on longer steep inclination, the regenerative braking of the motor is used to drive the vehicle and, as a result, the charging of the battery is assisted by the current produced by the regenerative braking, the battery easily reaching its saturated state. Accordingly, even when the regenerative operation of the motor is carried out, it is possible, after the battery has reached the charge saturation state, no more to charge it; accordingly, its current level is reduced and the braking force of the motor thereby is less.

One other problem in motor vehicles, having an electric drive mechanism, is that the electric drive mechanism must not exceed a maximum admissible rotational speed, since the mechanical strength is ensured only up to that point. But in electric vehicles, the rotational speed of the drive mechanism over the road is coupled with the speed of the vehicle. However, under certain driving conditions, such as in a downhill drive of longer duration, there is the danger that said admissible rotational speed be exceeded even though no drive torque actuates the wheels, especially in vehicles having great weight and low maximum speed as is the case in city autobuses. Due to the heavy weight, corresponding slope output forces appear while as result of the relatively low maximum speed a correspondingly lower tractional resistance simultaneously counteracts the weight so that rotational speed above the maximum rotational speed limit admissible can occur.

SUMMARY OF THE INVENTION

The problem on which the invention is based is to propose a method for control of a motor vehicle which prevents exceeding of the maximum rotational speed limit.

The inventive method, which at low construction cost, offers the advantage by a simple electric control of the electric drive mechanism, of preventing that in the presence of unfavorable situations such as downhill drive of long duration, the maximum admissible rotational speed limit of the electric drive mechanism is exceeded, the method being suitable both for motor vehicles with pure electric drive mechanism and also for hybrid vehicles while their electric motor is exclusively used, i.e. when the internal combustion engine is disconnected.

BRIEF DESCRIPTION OF THE DRAWINGS

The invention is explained, in detail below, with reference to the drawing;

In the only FIGURE is shown a diagram where the rotational speed is plotted on the abscissa and the drive torque on the ordinate.

DESCRIPTION OF THE PREFERRED EMBODIMENTS

As understood from the diagram, when a first defined threshold value 1 of the rotational speed n of the electric motor of the vehicle is exceeded, the drive torque M is cut back and as the rotational speed n continues to increase, it is reduced down to zero, as shown by the reference numeral 2.

As a consequence of a long downhill drive, if the rotational speed n of the electric motor now exceeds a second defined threshold value 3 of the rotational speed n, which is higher than the first threshold value 1, an electric brake is engaged which, as the rotational speed increases, is actuated until it exerts its maximum brake torque 4.

Therefore, with the inventive method in which when a first rotational speed limit 1 is exceeded, depending on one other rotational speed increase, the drive torque M is reduced down to zero while, when the rotational speed continues to increase, the electric brake is automatically engaged and controlled during continued increase of rotational speed up to the maximum electric brake torque, it can be prevented in an especially simple manner that motor vehicles equipped with the method, especially city autobuses, exceed the maximum rotational speed limit admissible when slope output forces correspondingly appear.

---

Reference numerals

| | |
|---|---|
| 1 threshold value | n rotational speed |
| 2 limit value | M drive torque |
| 3 threshold value | |
| 4 limit value | |

---

What is claimed is:

1. A method for controlling a motor vehicle having electric drive mechanism, in which one or more wheels are driven by an electric motor and which is provided with an electric brake and a control circuit, comprising the steps of:

a) determining when a first threshold value (1) of the rotational speed (n) of said electric motor is exceeded;

b) reducing the drive torque (M) during continued increase of the rotational speed (n) to zero;

c) engaging the electric brake when a second defined threshold value (3) of said rotational speed (n), which is higher than said first threshold value (1), is exceeded; and d) increasing the brake torque of the electric brake as the rotational speed increases to exert the maximum brake torque when a further limit value (4) is reached.

* * * * *